United States Patent [19]

Cornett et al.

[11] 4,142,742
[45] Mar. 6, 1979

[54] SWIVEL FITTING FOR FLEXIBLE CONDUITS

[76] Inventors: Gerald W. Cornett, 781-1 Eagle Creek Rd., Valparaiso, Ind. 46383; Kevin L. Cornett, 101 E. Westchester Ct., Chesterton, Ind. 46304

[21] Appl. No.: 833,443

[22] Filed: Sep. 15, 1977

[51] Int. Cl.² .............................................. F16L 39/04
[52] U.S. Cl. .................................. 285/136; 285/137 R
[58] Field of Search .................... 285/136, 134, 137 R

[56] References Cited

U.S. PATENT DOCUMENTS

| | | | |
|---|---|---|---|
| 2,293,585 | 8/1942 | Bard | 285/136 |
| 3,469,863 | 9/1969 | Riester et al. | 285/137 R |
| 3,986,732 | 10/1976 | Stanley | 285/134 |
| 3,990,731 | 11/1976 | Schnipke | 285/136 |

Primary Examiner—Thomas F. Callaghan

[57] ABSTRACT

A fitting interposed in a pair of fluid-conduits which lead together from one facility to another. The fitting has one unit with a center portion affording direct and confined passage between sections of one conduit; and such unit also receives one section of the other conduit. A second unit is rotatable in the first one with inner ends of both units formed with facing annular channels; and the second unit communicates with the other section of the second conduit. Thus, an impulse to rotate the second unit will maintain continuity betwen the sections of the second conduit through the universal communication between the facing channels; and the application of the second conduit may be duplicated in rotary sequence by additional conduits.

8 Claims, 6 Drawing Figures

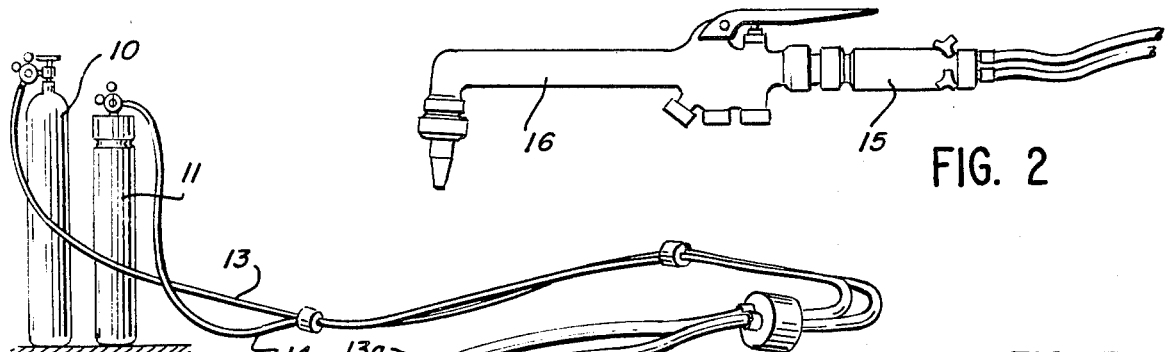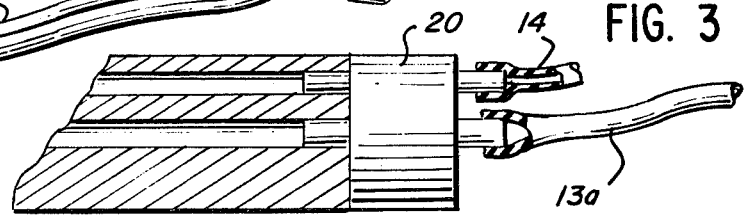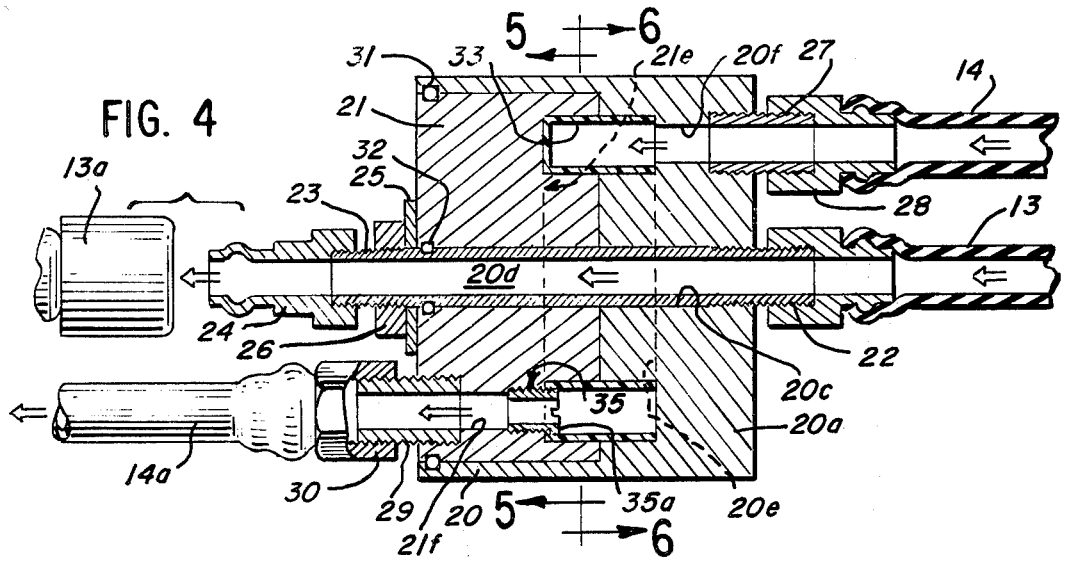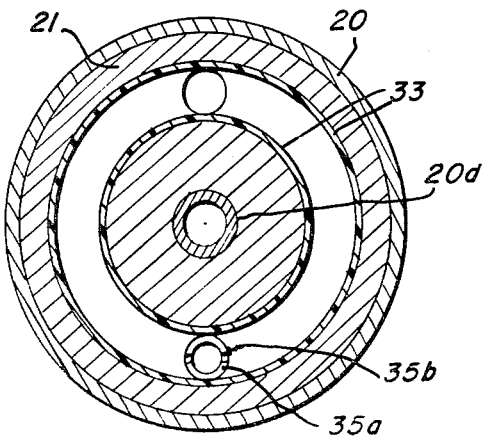

SWIVEL FITTING FOR FLEXIBLE CONDUITS

Our invention relates to devices employed to check dual conduits for fluids from twisting or snagging as they pass from one container to another. This is apt to occur when the conduits are of flexible material, and where twisting or snagging of the same would unduly compress or constrict fluids passing through the conduits. Generally, swivel devices to relieve the conduits of this difficulty develop a tendency for the medium in one conduit to seep or leak into that of the other conduit; and this tendency poses a risk where the media are under pressure and of a nature to explode spontaneously when combined.

In view of the above situation, it is one object of the present invention to provide a small fitting for the conduits which completely isolates one fluid from the other, avoiding the risk mentioned.

A further object is to design a fitting for welding torch conduits with a direct and confined passage for one conduit, and a remote system of passages for the other conduit.

Another object is to construct the fitting in a manner to function efficiently without the need of lubrication.

A final object is to make the novel fitting very simple and compact.

A better understanding of the invention may be gained by reference to the accompanying drawing, in which —

FIG. 1 is a perspective view of the fitting as installed in a number of places along a set of conduits serving a welding torch;

FIG. 2 is a view of the fitting applied to the base of the torch;

FIG. 3 is an enlarged section showing the connection between the fitting and the base of the torch;

FIG. 4 is a magnified axial section of the fitting; and

FIGS. 5 and 6 are sections on the lines 5—5 and 6—6 of FIG. 4.

Referring specifically to the drawing, it may be assumed that the most important application of the invention deals with welding equipment. Thus, FIG. 1 shows the supply units for the same as an oxygen tank 10 and an acetylene gas tank 11. Suitable fittings are indicated for leading oxygen and gas from these tanks through flexible conduits 13-13a and 14-14a, respectively, into the base 15 of a conventional welding torch 16.

The present invention is a special fitting interposed in the aforesaid conduits in one or more places where twisting or snagging of the conduits could develop from the manipulation of the torch in the direction of the work. Thus, as clearly illustrated in FIG. 4, the novel fitting is mainly in the form of a circular cup 20 having a deep cavity in which a cylinder 21 is seated. These parts are of metal or plastic material — with the cup only about 1½ inches in diameter — and made solid to be rigid and durable. The base 20a of the cup has an outward central nipple 22 for connecting the conduit 13 leading from the oxygen tank 10; and the nipple communicates with a central bore 20c in the cup leading into a tube 20d. The latter extends as a nipple 23 from the opposite end to receive a coupling 24 connecting with the continuation 13a of the oxygen conduit 13 going to the torch 16. The nipple 23 also carries means to keep the cylinder 21 seated in the cup 20. Outside the cylinder the nipple receives a rubber washer 25, and then a nut 26. When the fitting is assembled, the nut is advanced to a point where the cylinder secures a sliding contact with the cup base 20a.

FIG. 4 shows that the opposed inner surfaces of the cup 20 and cylinder 21 are recessed with facing annular channels 20e and 21e. A bore 20f in the marginal part of the cup leads with one end into a nipple 27 extending from the outer end of the cup to receive a suitable coupling 28 for receiving the conduit 14 from the gas tank 11. Also, a similar bore 21f in the marginal part of the cylinder 21 leads with its inner end into the channel 21e, and with its outer end into a nipple 29 extending from the outer end of the cylinder to connect with a coupling 30 leading through the continuation 14a to the torch.

It will now be apparent that the oxygen feed for the torch receives a direct passage through the center of the cup 20, affording an uninterrupted passage for oxygen from the conduit 13 through the cup and continuation 13a on the way to the torch; and the passage is confined and therefore leak-proof.

As to the gas feed for the torch, it is noted in FIG. 4 that the gas entering into the bore 20f meets and fills the annular channel 20e as well as the adjoining channel 21e; and the only outlet from the latter is the bore 21f leading into the continuation 14a of the gas conduit that goes to the torch. It is further apparent that the cup 20 is free to rotate relative to the cylinder 21, such as from a lateral tug or twist imposed on the conduit 14 leading from the gas tank. The fitting will thus swivel and impose no turning or twisting strain on the oxygen and gas conduit continuations 13a and 14a leading to the torch. It follows, therefore, where the turn or strain is imposed on the continuation conduits 13a and 14a, that the cylinder 21 will swivel in relation to the cup 20. Thus, a lateral impulse to rotate one unit relative to the other will maintain continuity between the units through the universal communication between the facing channels thereof. It is also conceivable that the principle of the present fitting may be applied where more than two conduits lead together from one area to another.

The tight confinement of the oxygen through the fitting of course insures against leakage of oxygen. This is important because the oxygen is fed under much higher pressure than the acetylene gas, making leakage highly probable if seals are used. The provision of an air-tight passage for the oxygen therefore excludes the possibility of leakage. Also, the perfect confinement of the oxygen passing through the fitting prevents the entrance of any medium which could mix with the oxygen and create a risk. It is known, when acetylene gas is confined or compressed with oxygen, that the mixture will explode even spontaneously. However, with the gas positively excluded from the oxygen passage, the present fitting can be considered explosion-proof. It is also important that the fitting be made proof to the leakage or waste of the gas; and FIG. 4 shows that suitable sealing rings 31 are installed between the cylinder and the mouth of the cup 20, and sealing rings 32 installed between the cylinder and the issuing part of the tube 20c. These rings could incorporate a lubricant to render the swiveling smooth, although this may not be necessary because the swiveling turns of the fitting would ordinarily be short or infrequent.

It is also important to seal the acetylene gas from leaking from the toroidal compartment formed by the facing channels 20e and 21e, both in outward direction to seep past the sealing ring 31, and in inward direction to seep past the sealing ring 32. A special toroidal seal 33 of rubber or like substance, illustrated in section in FIG. 4, is therefore interposed when the cup 20 is assembled with the cylinder 21 to make a snug fit across their meeting region, which is where the leakage would occur; and the seal may be of U-section as shown to seat with one end in one of the channels. The drawing shows the seal seating in the channel 21e. Since the seal must have an opening into the bore 21f — see bottom center of FIG. 4 — provision is made against the rotation of the seal from the swiveling of the cup 20 and cutting off passage into the bore. Thus, before the cup 20 is assembled with the cylinder 21, a tubular screw 35 is threaded through the opening in the seal into the bore 21f, as seen in FIG. 4, until the lead 35a of the screw secures the seal in place; and FIG. 5 shows that the screw head is slotted at 35b for the application of a screw driver to fasten the seal as just described.

It is now apparent that the improved swivel fitting is an accessory which is simple in construction, and of a nature to be produced at low cost and guaranteed against leakage or explosion. While interposed in conduits wherever desirable, the fitting could be installed directly into the base of the torch, as indicated in FIG. 3, and be applied to conduits for other utilities where liquids must take a long and tortuous course to reach nozzles where they may be dispensed at different rates or pressures to form a product in a final vessel. It is thus possible to adapt the present invention wherever fluids are dispensed by way of multiple flexible conduits.

We claim:

1. A swivel fitting for communication between the sections of a pair of conduits comprising one unit having centrally positioned bore means affording communication between the respective sections of one conduit, a second unit centered around said bore means to rotate in the first unit, the units having inter-end faces in contact, each end face formed with a facing annular recess centered as to the units, the recesses combining to form an annular channel, means on each unit connectable to the respective sections of the other conduit and passing through each respective unit into communication with the channel, means cooperating with said bore means and the outer surface of the second unit to retain said second unit within said first unit, and hollow sealing means positioned within said chamber and secured to the recess of one of said units so as to be rotatable therewith to prevent escape from the interior of the fitting of the fluid passing through the second conduit.

2. A swivel fitting composed of a pair of units in end-to-end contact, one unit with a central tube extending through said unit at both ends, the other unit disposed within the one unit rotatably about said tube, the inner ends of the units having annular recesses in facing relation and centered about the tube to form an annular chamber, first means connecting one section of one conduit to the outer end of the first mentioned unit for communication with one end of the tube, second means connecting the other section of the one conduit with the other end of the tube at the outer end of the other unit, third means on said one unit to connect one section of a second conduit with the recess in the first-mentioned unit, fourth means on said other unit to connect the other section of the second conduit with the recess in the second unit, means cooperating with said other end of said tube and the outer surface of the other unit to retain said other unit within said one unit and hollow sealing means positioned within said chamber and secured to the recess of one of said units so as to be rotatable therewith to prevent escape from the interior of the fitting of the fluid passing through the second conduit.

3. The structure of claim 2, the first unit being circularly cup-shaped in the end containing the channel, and the second unit being a cylinder seating in sliding engagement with the wall of the first unit.

4. The structure of claim 3, and a ring interposed between the cylinder and said wall to provide a seal therebetween and substantially friction-free relative movement between said wall and cylinder.

5. The structure of claim 3, and a ring interposed between the cylinder and said tube to provide a seal there-between and substantially friction-free relative movement between said tube and cylinder.

6. The structure of claim 2, the hollow sealing means being toroidal of rectangular cross-section with a closed end and an open opposing end, the closed end being fitted in one of said recesses.

7. The structure of claim 6, including an opening in the closed end, and further means being applied to said recess by way of the opening to check the sealing means from turning.

8. The structure of claim 7, said further means comprising a tubular screw means threaded from the sealing means by way of the opening to fasten the sealing means to the recess of the unit into which the closed end has been placed and check the sealing means from turning.

* * * * *